United States Patent [19]

Noar et al.

[11] 4,290,316

[45] Sep. 22, 1981

[54] FREE-ROTOR GAS-BEARING GYROSCOPE HAVING ELECTROMAGNETIC ROTOR RESTRAINT AND ACCELERATION OUTPUT SIGNAL

[75] Inventors: Raymond Noar, Bellflower; Stanley L. Zedekar, Huntington Beach; Michael D. Albertson, Tustin; Carl W. Pointer, Placentia; Chester E. Gall, Long Beach; Alfred B. Fuller, Anaheim, all of Calif.

[73] Assignee: Rockwell International Corporation, El Segundo, Calif.

[21] Appl. No.: 48,301

[22] Filed: Jun. 13, 1979

[51] Int. Cl.³ .............................................. G01C 19/30
[52] U.S. Cl. ................................... 74/5.46; 74/5.6 E
[58] Field of Search ......................... 74/5.4, 5.46, 5.6 E, 74/5.6 D; 73/504, 505, 517 B

[56] References Cited

U.S. PATENT DOCUMENTS

| | | | |
|---|---|---|---|
| 2,919,583 | 1/1960 | Parker | 74/5 |
| 3,025,708 | 3/1962 | Slater et al. | 74/5.46 |
| 3,044,309 | 7/1962 | Buchhold | 74/5 |
| 3,073,170 | 1/1963 | Slater et al. | 74/5.4 |
| 3,077,553 | 2/1963 | Borghard et al. | 318/28 |
| 3,089,044 | 5/1963 | Bolton | 310/36 |
| 3,107,540 | 10/1963 | Curriston | 74/5.4 |
| 3,122,022 | 2/1964 | Wuerth et al. | 73/490 |
| 3,142,183 | 7/1964 | Dane | 74/5.7 |
| 3,142,993 | 8/1964 | Möller | 74/5.6 |
| 3,148,550 | 9/1964 | Iddings | 74/5.6 |
| 3,188,540 | 6/1965 | Lautzenaiser | 318/23 |
| 3,225,605 | 12/1965 | Slater | 73/503 |
| 3,242,745 | 3/1966 | Romberg | 74/5.46 |
| 3,251,233 | 5/1966 | Duncan et al. | 74/5.46 |
| 3,252,340 | 5/1966 | Watt | 74/5.41 X |
| 3,283,587 | 11/1966 | Hoffman | 73/504 |
| 3,283,594 | 11/1966 | Parker et al. | 74/5.46 |
| 3,323,040 | 5/1967 | Wright | 323/51 |
| 3,347,105 | 10/1967 | Polushkin et al. | 74/5.6 |
| 3,452,609 | 7/1969 | Goodhue et al. | 74/5.6 |
| 3,490,297 | 1/1970 | Brodersen | 74/5.46 |
| 3,508,444 | 4/1970 | Sitomer et al. | 53/517 |
| 3,540,293 | 11/1970 | Cochin | 74/5 |
| 3,557,629 | 1/1971 | Quermann | 74/5.6 |
| 3,596,523 | 8/1971 | Clark | 74/5.6 |
| 3,706,231 | 12/1972 | Ncar et al. | 74/5 R |
| 3,863,508 | 2/1975 | Scarborough et al. | 73/516 R |
| 3,886,803 | 6/1975 | Jacobson et al. | 74/5.6 D |
| 3,913,406 | 10/1975 | Johnston | 73/516 R |
| 3,954,024 | 5/1976 | Staats | 74/5.41 |
| 4,000,660 | 1/1977 | Brodersen | 74/5.43 |
| 4,068,533 | 1/1978 | Ferriss | 74/5.6 D |
| 4,145,929 | 3/1979 | Aske | 73/517 B |

Primary Examiner—Rodney H. Bonck
Attorney, Agent, or Firm—H. Fredrick Hamann; Gilbert H. Friedman

[57] ABSTRACT

A two degree-of-freedom, free-rotor, gas-bearing gyroscope having greatly reduced sensitivity to acceleration-induced and other disturbances. An electromagnetic forcer acts on the rotor to keep the axial component of bearing deflection negligible. Closed-loop control circuitry for energizing the axial forcer responds to a linear displacement signal. The circuitry also provides an output signal proportional to the component of acceleration along the spin axis. This signal may be used to replace an accelerometer output signal in navigation equipment. In addition to be being functional during normal operation, the control functions during start-up and shut-down to center the rotor over the support ball. The functions of forcer and torquer are combined in a single structure. A dual motor arrangement and a dual forcer-torquer arrangement provide cancellation of bias variations due to housing, shaft, and bearing deflections. The ball support shaft has larger diameter and the gas fill pressure is lower than would be feasible in the absence of the electromagnetic axial forcing.

20 Claims, 7 Drawing Figures

FREE-ROTOR GAS-BEARING GYROSCOPE HAVING ELECTROMAGNETIC ROTOR RESTRAINT AND ACCELERATION OUTPUT SIGNAL

The invention herein described was made in the course of or under a contract, or subcontract thereunder, with the U.S. Air Force.

BACKGROUND OF THE INVENTION

1. Field of the Invention

The present invention relates to improvements in inertial navigation gyroscopes, and more particularly pertains to a new and improved two degree-of-freedom, free-rotor, gas-bearing gyroscope.

2. Description of the Prior Art

A typical free-rotor gyroscope is described in U.S. Pat. No. 3,025,708, "Free-Rotor Gyroscope Motor and Torquer Drives", issued Mar. 20, 1962, to J. M. Slater et al and assigned to the assignee of the present invention.

In such a gyroscope, the rotor is supported on a self-acting or autolubricated ball-and-socket gas bearing. A spherical support ball is typically the stationary part of the bearing while the socket, or concave element, is part of the rotor. When the gyro is subjected to acceleration, the gas bearing is deflected, i.e., the rotor is displaced from a centered position over the support ball. The resultant eccentricity of the bearing causes disturbance or error torques to be exerted on the rotor. The eccentricity of the bearing can be separated into a component parallel to the spin axis and components in the radial direction, i.e., normal to the spin axis.

Analysis has shown that the spin-axis component of bearing eccentricity is present as a factor in the significant terms of the expressions describing the acceleration-induced disturbance torques. The disturbance torques cause drift and errors. It is apparent then that the magnitudes of the disturbance torques are functions of the degree to which acceleration of the gyro displaces the rotor relative to the gas bearing along the spin axis.

In the prior art, forces directed axially to counteract the effects of acceleration and to center the rotor over the support ball have been provided by the bearing itself augmented by thrust pads formed in the spherical surface of the concave element on the rotor. However, the bearing and the thrust pads provide a relatively soft or compliant centering effect. They do not furnish that degree of stiffness to the gas bearing which would reduce the acceleration-induced errors to acceptable levels for some applications. In order to achieve the degree of navigational precision required for those applications, the outputs of the inertial sensors must be compensated. In the prior art, this has been accomplished using elaborate algorithms implemented electronically. The correction for gyro errors by compensation using, for example, electronic digital computers is relatively expensive and cumbersome. In addition, the requirement for the compensation unduly limits the applicability of the gas-bearing gyro. Therefore, it would be highly desirable to have the benefits of a free-rotor gas-bearing gyro in which acceleration-induced errors would be negligibly small. It has long been apparent that these benefits could not be supplied in such a gyroscope which relies only upon the gas-bearing and its thrust pads for maintaining the rotor axially centered over the support ball.

The gas bearing and thrust pads, of course, are only fully operative while the rotor is spinning at rated speed. The rotor lifts off radially on the bearing at relatively low spin speeds. However, somewhat higher spin speed is required for rotor levitation in the axial direction. Because of these factors, during gyro start-up and shut-down, the rotor tends to rub against the support ball. The resultant scuffing generates considerable wear debris which collects in the narrow bearing gap between the rotor and the support ball. Most of the wear debris is produced from scuffing between regions of the rotor and support ball near the shaft.

When the bearing deflects due to acceleration, the rotor tends to come in contact with the wear debris. This contact is an additional source of disturbance torques in the gyro. In addition, debris generation is one of the few failure modes of the gas-bearing free-rotor gyro. Hence, there has long been a desire to eliminate the generation of debris during starting and stopping in gas-bearing free-rotor gyros.

A typical eddy current motor drive for a gas-bearing free-rotor gyro includes a thin conductive cylindrical shell or sleeve on the rotor, the sleeve being centered on the spin axis. The sleeve is disposed within the gap of a polyphase stator for which the magnetic path is completed by a magnetic member spaced as close as possible to the conductive sleeve while preserving the small amount of tilt freedom necessary for the rotor. It is generally regarded as desirable to locate the motor and its sleeve relatively close to the spin axis at a selected diameter. At the selected diameter, disturbance effects due to direct hydrodynamic coupling and disturbance effects due to direct magnetic coupling tend to cancel each other.

A typical eddy current torquer drive for a gas-bearing free-rotor gyro includes a thin conductive cylindrical shell on the rotor disposed to operate in conjunction with a fixed set of electromagnets, differentially energized, opposed to a closely-spaced flux return member. The torquer construction thus resembles that of the motor drive. The motor sleeve and the torquer sleeve are typically mounted on opposite sides of the gyro rotor at the same selected diameter. This construction is regarded as desirable since it results in a structurally balanced configuration for the gyro rotor. With the exception of devices such as gyro pendulums in which the rotors are deliberately unbalanced, it is usually essential that the rotating member be precisely balanced radially, axially, and dynamically.

While the structurally balanced construction described above has the advantage of providing mechanical symmetry, it does not provide electromagnetic symmetry. A motor provides spin-axis torque at one side face of the rotor while a torquer provides torque about radial axes at the other side face of the rotor. Bias variations occur in the motor and the torquer when the gyro is subject to acceleration. They are due to elastic deflections of the housing and the support-ball shaft which distort the motor and torquer gaps. They are also due to the eccentric displacements of the motor and torquer sleeves occurring as a result of bearing deflection. These variations are error sources. It has long been desired to eliminate them.

Free-rotor gyros are subject to disturbances due to turbulence in the fluid medium surrounding the rotor. Means for reducing the random drift caused by these disturbances are disclosed in U.S. Pat. No. 3,706,231, "Turbulence and Vortex Suppression in Gyros", issued to Noar et al and assigned to Rockwell International Corporation the assignee of the present invention. Noar is a co-inventor herein. The reduction in fluid-medium vortex action and turbulence is accomplished by the introduction of certain structural protrusions and the like. However, this approach introduces added complexity and cost into the manufacture of the gyros. Therefore, there has long been a desire to reduce disturbances due to fluid-medium turbulence in a gas-bearing free-rotor gyro without the use of structural protrusions.

SUMMARY OF THE INVENTION

An object of the present invention is to provide an improved gas-bearing free-rotor gyroscope having greatly reduced acceleration-induced disturbances and errors.

An additional object of the invention is to provide a gas-bearing free-rotor gyroscope usable without compensation for acceleration-induced errors in high-precision navigation applications.

Yet another object is to provide a gas-bearing free-rotor gyroscope, wherein the spin-axis component of bearing eccentricity due to acceleration is reduced to a negligible amount.

Still another object is to reduce or eliminate reliance on the gas bearing and hydrodynamic thrust pads for spin-axis centering of the rotor in a gas-bearing free-rotor gyro.

A further object of the invention is to provide a gas-bearing free-rotor gyroscope which can provide an output signal proportional to the component of acceleration along the gyroscope spin-axis.

A still further object is to greatly reduce the generation of debris in a gas-bearing free-rotor gyroscope.

Another object is to reduce disturbance torques due to debris contact in a gas-bearing free-rotor gyroscope.

A further object of the invention is to provide a gas-bearing free-rotor gyroscope in which motor bias variations due to acceleration and the errors related thereto are greatly reduced.

Still another object is to reduce random drift due to turbulence in the fluid medium in a gas-bearing free-rotor gyroscope without the use of structural protrusions and the like.

According to the present invention, the foregoing and other objects are obtained by incorporating an electromagnetic axial forcer into the gyroscope. The forcer is disposed to act on the rotor in the direction of the spin axis to reduce the spin-axis components of bearing deflection and bearing eccentricity to negligible amounts.

Also, according to the invention, closed-loop control circuitry configured to amplify a linear displacement signal proportional to sensed axial rotor deflection is provided to energize the axial forcer in accordance with the displacement signal. The linear displacement signal is a function of the component of acceleration along the spin axis. The control circuitry is operative to axially center the rotor over the support ball during gyro start-up and shut-down as well as during normal operation.

The electromagnetic axial forcer, energized by the closed-loop control circuitry, provides greatly increased stiffness for the gas bearing. Consequently, there is no need to compensate for acceleration-induced errors when a gyro in accordance with the invention is used in precision navigation applications. Furthermore, by greatly reducing bearing deflection in the axial direction, the invention tends to eliminate contact with debris and the attendant drift which results from such contact.

A gas-bearing free rotor gyro in accordance with the invention has the additional advantage of acting as an accelerometer as well as a gyroscope since the current provided by the closed-loop control circuitry to energize the forcer is proportional to the spin-axis component of acceleration and may thus be used to provide an acceleration input signal to that portion of navigational equipment which performs navigation computations. Navigational equipments using gyroscopes in accordance with the invention may then use fewer accelerometers than has been customary. Because of their ability to operate with fewer navigational instruments, such equipment will be simpler, more reliable, and less expensive. Three identical gyro-accelerometers in accordance with the invention could be the only inertial instruments needed for an inertial navigation platform. Such a platform would be smaller, simpler and more reliable than those heretofore available.

By providing for axial centering of the rotor during start-up and shut-down, the invention provides the advantage of greatly reduced scuffing between the rotor and the support ball. The generation of wear debris is thereby greatly reduced. The disturbance torques which may arise due to contact with debris are therefore decreased even further. In addition, the accumulation of debris becomes a significantly less likely source of failure in a gyro according to the invention.

Since substantially all of the axial thrust load is born by the controlled axial forcer, an additional advantage is provided. Because little or no axial thrust load is required to be borne by the gas-bearing, the area required for the spherical socket on the rotor in the region of the support-ball shaft is reduced. This makes possible the use of a larger diameter, and therefore stiffer, support-ball shaft. Consequently, a gas-bearing free-rotor gyroscope in accordance with the invention has a support-ball shaft which is larger and stiffer than would otherwise be feasible. The advantage gained thereby is that support-ball shaft deflections and the accompanying disturbances resulting from the effects of shaft elasticity under acceleration conditions are reduced.

It is known that gas bearings are inherently stiffer in the radial direction than axially. Gas fill pressures heretofore used in gas-bearing gyroscopes have had to be relatively high to provide even the relatively low prior-art force levels for axial centering of the rotor. In a gyroscope in accord with the invention, because axial centering is provided by the electromagnetic axial forcer, gas fill pressures used therein may be significantly reduced while still maintaining adequate ability of the bearing to resist radial deflection under acceleration loads. This provides three advantages. First, the lower gas density reduces random drift due to fluid medium turbulence. Second the random drift reduction is obtained without the use of structural protrusions and the like. And third, at lower gas densities, less spin torque is required to maintain rotor speed. At lower spin torque, motor bias variations due to housing and shaft deflections and the errors which result therefrom are reduced. Consequently, a gas-bearing free-rotor gyroscope in accord with the invention uses a lower gas fill pressure therein than would otherwise be feasible.

In a gyroscope according to the invention, two identical motor drives are disposed symmetrically about the rotor. That is, a motor drive is disposed at each side face of the rotor. The spin drive is thus electromagnetically symmetrical as well as structurally balanced. Each of the two motors is located at the same selected diameter at which disturbance effects due to direct hydrodynamic coupling and direct magnetic coupling tend to cancel each other. With this dual motor arrangement, acceleration-induced motor bias variations of one motor due to elastic deflections of the housing and shaft and due to bearing deflections tend to be cancelled by those of the other motor. Thus, the errors which result from motor bias variations tend to be eliminated.

When the dual motor arrangement discussed above is implemented, the space occupied by the torquer in a typical prior art gyro is preempted by the second motor drive. To accommodate the dual motor in a gyroscope according to the invention, the torquing function is efficiently incorporated into the same electromagnetic structure which provides axial rotor forcing. In addition, to insure structurally balanced operation of the rotor, the combined forcer-torquer structure is disposed symmetrically about the rotor. That is, there are two coaxial forcer-torquer structures, one disposed at each side face of the rotor. This dual forcer-torquer arrangement provides an additional advantage in that the electromagnetic symmetry of the torquer tends to eliminate the acceleration-induced torquer bias variations discussed above. It also prevents the introduction of errors due to bias variations in the operation of the forcer. That is because the bias variations of one forcer-torquer due to elastic deflections of the housing and shaft and due to bearing deflections tend to be cancelled by those of the other coaxial forcer-torquer. Thus the errors which might result from forcer-torquer bias variations do not arise.

Thus, it is seen that a gyroscope according to the invention harmoniously combines several novel features to achieve the effect of greatly improved performance under conditions of acceleration.

DESCRIPTION OF THE PREFERRED EMBODIMENT

Figure 1:
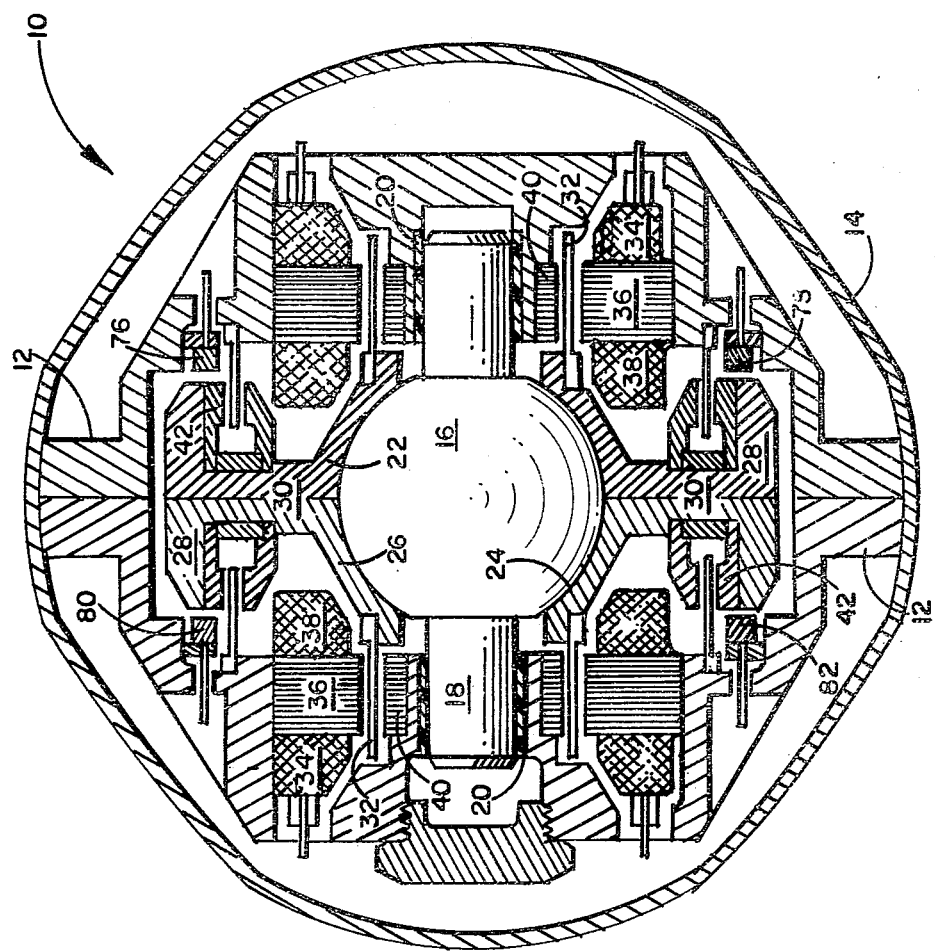
FIG. 1 is an elevation cross-section of a free-rotor, gas-bearing gyroscope conforming to the invention.

Referring now to FIG. 1, there is shown a two-degree-of-freedom, free-rotor, gas-bearing gyroscope 10 conforming to the invention. A frame 12 for the gyroscope 10 is mounted in a hermetically sealed enclosure 14. A spherical support ball 16 is fixed to a shaft 18 which is, in turn, fixed to the frame 12. The support ball 16 and shaft 18 are electrically insulated from the frame 12 by insulating sleeves 20 surrounding the shaft 18.

A rotor 22 is supported over the support ball 16 on an autolubricated gas bearing at 24. The rotor 22 comprises a hub 26 having a socket fitted to the spherical surface of the ball 16, a rim or outer peripheral section 28, and a web section 30 intermediate the hub 26 and the rim 28. When the rotor 22 is precisely aligned, its spin axis is coincident with the central axis of support-ball shaft 18.

Symmetrically attached to opposite side faces of the rotor 22 by any convenient means, e.g., a shrink fit, are two coaxial cylindrical motor sleeves 32. The cylindrical shells comprising the motor sleeves 32 may be constructed of any material having a suitably high electrical conductivity. Two motor stators 34 are symmetrically disposed on opposite sides of the gyro frame 12 adjacent to the motor sleeves 32. Each motor stator 34 includes a cylindrical core 36 of silicon steel laminations fixedly mounted on the frame 12. Polyphase windings 38 are mounted in suitable slots on the inner periphery of the cores 36. A pair of rings 40, also cnstructed of silicon steel laminations, are fixedly mounted to the frame 12 to provide flux return paths for the rotating magnetic fields established by polyphase currents in the windings 38. Motor torque results when eddy currents are generated in the sleeves 32.

The motor sleeves 32 are preferably fixed to the rotor hub 26 at a diameter through the spin axis which is selected to provide cancellation of the disturbance effects due to direct hydrodynamic coupling and direct magnetic coupling. Selection of the diameter at which this cancellation occurs is well known to those skilled in the art.

There is thus provided for the gyro 10 a dual motor drive for spinning the rotor 22. The two eddy current drive motors described hereinabove are symmetrically disposed about the rotor 22, both geometrically and electromagnetically. With this dual motor arrangement, acceleration-induced motor bias variations of one motor due to elastic deflections of the housing and shaft and due to deflection of the rotor 22 from a centered position over the support ball 16 tend to be cancelled by similar bias variations of the other coaxial drive motor.

Two electromagnetic forcer-torquer structures 42 are coaxially and symmetrically disposed to operate on the rotor 22 at the opposite side faces thereof. The details of construction and operation of the forcer-torquers 42 will be more clearly observed by referring to FIGS. 2, 3 and 4.

Figure 2:
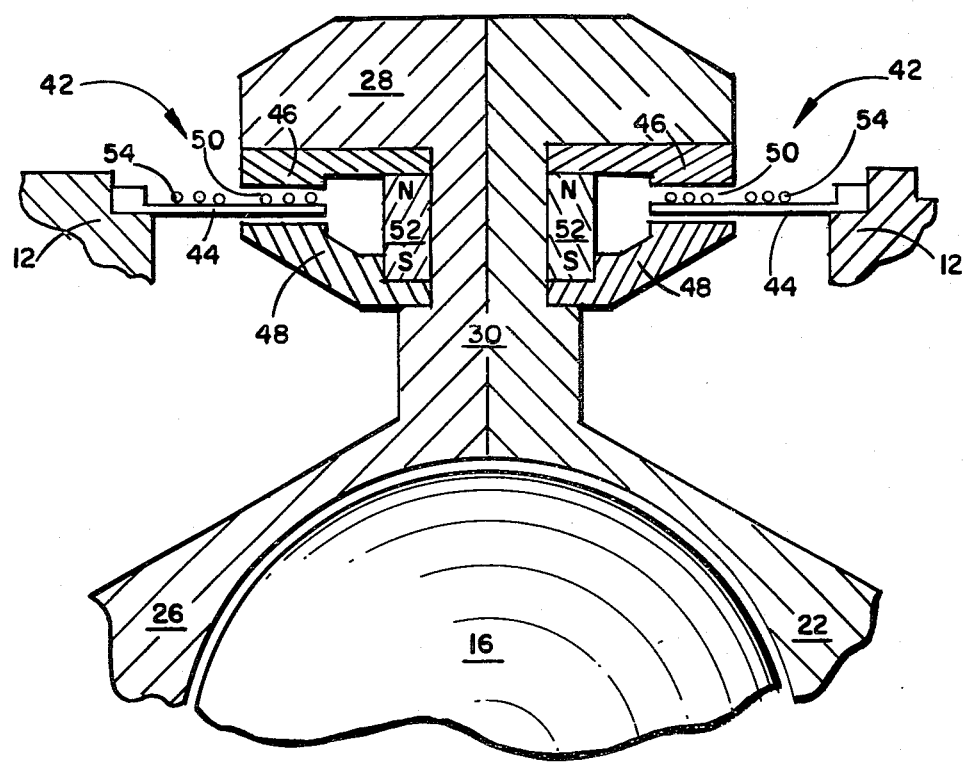
FIG. 2 is an enlarged view of a portion of FIG. 1 showing in more detail the spatial relationship of forcer-torquer coils to a gyroscope rotor.

FIG. 2 shows a fragment of the gyro 10 of FIG. 1 enlarged to provide enhanced understanding of the forcer-torquer structures 42. Symmetrically attached to the frame 12 on opposite sides of the rotor 22 are two cylindrical coil sleeves 44. The coaxial cylindrical shells comprising the coil sleeves 44 extend toward the web section 30 of the rotor 22. The coil sleeves 44 may be formed of any suitable insulating material.

Each forcer-torquer structure 42 includes a pair of pole pieces 46 and 48 fixedly mounted to a side face of the rotor 22 at the web section 30. The pole pieces 46 and 48 may be of any suitable readily magnetizable material. Each pole piece is formed as a ring centered on and encircling the rotor spin axis. A space between each pair of pole pieces 46 and 48 forms a gap 50 wide enough to receive a corresponding coil sleeve 44 and coils 54 disposed thereon. Each coil sleeve 44 extends into that gap 50 which is provided for it at the corresponding side face of the rotor 22.

On each side of the rotor 22, a plurality of permanently magnetized bars 52 are affixed to the web section 30 thereof. Each bar 52 is disposed between and in contact with a pair of pole pieces 46 and 48 to establish a magnetic field across each gap 50. The flux of the magnetic field in each gap 50 extends radially with respect to the spin axis and extends in the same radial direction in each gap.

Each coil 54 is formed as a loop lying on, conforming to, and fixedly mounted to its associated coil sleeve 44. As shown in FIG. 2, a portion or reach of each coil 54 is positioned within its associated magnetic gap 50 and another portion or reach of each coil 54 is positioned outside thereof. With this arrangement, it is the reaction between the current in that reach of each coil 54 lying in the gap 50 and the magnetic field therein which produces the preponderance of any force generated. That reach of each coil 54 which lies outside its gap 50, and thus outside the region of intense magnetic field, produces considerably less force, if any.

With the polarity of magnetic field shown in FIG. 2, that is, with the north pole of the permanent magnet bars 52 disposed radially outward, the direction of the flux in the gaps 50 is, according to convention, radially inward. Assume that current in those reaches of the coils 54 lying within the gaps 50 is flowing out of the plane of FIG. 2. Then the force on the coils 54 arising out of the interaction between the current and the magnetic field in the gaps 50 will be to the right of a viewer of FIG. 2. Therefore, the axial force on the rotor 22 contributed by that interaction will be to the left of the viewer.

Although the particular configuration shown in FIG. 2 for the forcer-torquer structures 42 is preferred, other equally operable arrangements will occur to those skilled in the art. For example, electromagnetic means may be used to establish a magnetic field in the gaps 50 in place of permanent magnet means. As another example, the means for establishing the magnetic field for a forcer-torquer structure may be fixed to the frame 12 while the coils may be fixed to the rotor 22.

Figure 3:
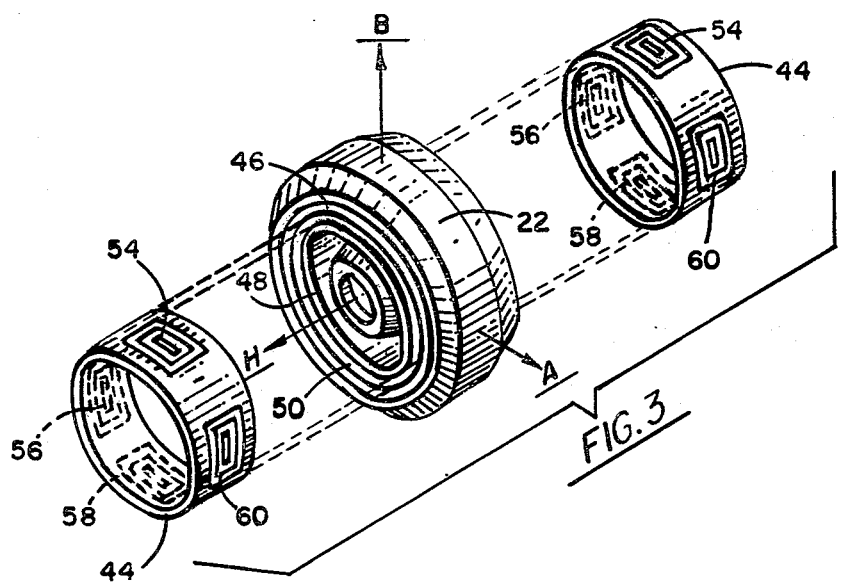
FIG. 3 is an exploded view, in perspective, showing further the spatial relationships of forcer-torquer coils and sleeves to the rotor.

Referring now to FIG. 3, the rotor 22 is shown with the coil sleeves 44 removed from the gaps 50 to better illustrate the dynamics of an electromagnetic forcer-torquer in accordance with the invention. Each of the coil sleeves 44 has four similar coils 54, 56, 58 and 60, disposed thereon. Each of coils 54, 56, 58 and 60 occupies a distinct quadrant on the associated coil sleeve 44.

In FIG. 3, the rotor spin axis is designated H. The horizontal radial axis is designated A. The vertical radial axis is designated B.

As shown in FIG. 3, on each of the symmetrically disposed coaxial coil sleeves 44, coils 54 and 58 constitute a pair of coils positioned opposite each other on a vertical line through and orthogonal to the central axis of coil sleeve 44. When the currents in coils 54 and 58 are such that the forces produced by each of them are the same, i.e., having the same magnitude and direction, only axially directed force is produced. However, if the forces produced by coils 54 and 58 differ, a torque on the rotor 22 about the A axis is produced in addition to the axial force. Furthermore, on each of the coil sleeves 44, coils 56 and 60 constitute a pair of coils positioned opposite each other on a horizontal line through and orthogonal to the central axis of coil sleeve 44. When the currents in coils 56 and 60 are such that the forces produced by each of them are the same, i.e., having the same magnitude and direction, only axially directed force is produced. However, if the forces produced by coils 56 and 60 differ, a torque on the rotor 22 about the B axis is produced in addition to the axial force.

As will be apparent to those skilled in the art, a complete forcing capability and a complete torquing capability for a free-rotor, gas-bearing gyro can be provided using only one coil sleeve 44 having on it the equivalent of two pairs of coils capable of producing axial force and torques about two orthogonal radial axes. However, a gyro in accord with the invention preferably uses two coaxial forcer-torquer structures 42 in a dual forcer-torquer arrangement as illustrated in FIGS. 1, 2 and 3 to obtain the benefits of mechanical and electromagnetic symmetry as discussed above. Furthermore, it is apparent that a complete forcing capability can be provided by driving only one pair of coils, e.g., coils 54 and 58 on a single sleeve 44 with substantially equal forcing currents to provide axial force. The remaining pair of coils, e.g., coils 56 and 60, could be provided with torquing currents only to provide torque about the associated radial axis.

Figure 4:
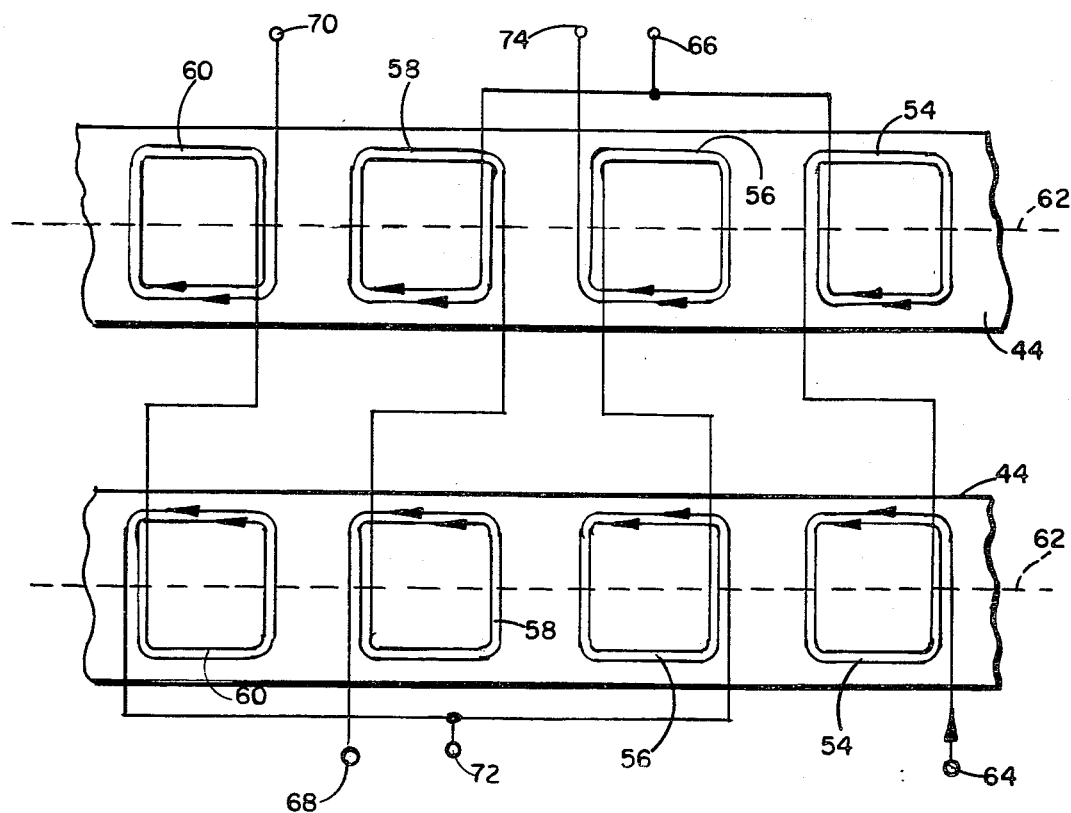
FIG. 4 is a schematic layout wiring diagram of the forcer-torquer coils.

A suitable manner of interconnecting the two sets of coils 54, 56, 58 and 60 on the two coil sleeves 44 for combined forcing and torquing is shown in the layout wiring diagram of FIG. 4. The portions of these coils which are in the magnetic fields in the gaps 50 between pole pieces 46 and 48 of FIG. 2 are those reaches of coils 54, 56, 58 and 60 which lie in the region between the pair of dashed lines 62 in FIG. 4. The two coils 54 and the two coils 58 are connected in series with each other. Forcing current for coils 54 and 58 may, for example, enter at terminal 64, flow through both coils 54 past terminal 66, flow through both coils 58, and exit at terminal 68. The two coils 56 and the two coils 60 are connected in series with each other. Forcing current for coils 56 and 60 may, for example, enter at terminal 70, flow through both coils 60 past terminal 72, flow through both coils 56, and exit at terminal 74. For this example, all of the currents are flowing to the left in FIG. 4 in those reaches of coils 54, 56, 58 and 60 which are between dashed lines 62 and are therefore in the magnetic fields. This direction of current flow is indicated by arrows. For magnetic flux directed out of the plane of FIG. 4, the axial force thus produced on the rotor 22 would be directed vertically downward in the plane of FIG. 4.

Torquing current for coils 54 and 58 may enter the circuit of FIG. 4 at terminal 66. This torquing current divides equally between coils 54 and coils 58. Half of the torquing current flows counter to the arrows through coils 54 and exits at terminal 64. The other half of the torquing current flows with the arrows through coils 58 and exits at terminal 68. By superposition, the total current through coils 54 is the forcing current diminished by half of the torquing current while the total current through coils 58 is the forcing current augmented by half of the torquing current.

Torquing current for coils 56 and 60 may enter the circuit of FIG. 4 at terminal 72. This torquing current divides equally between coils 56 and coils 60. Half of the torquing current flows with the arrows through coils 56 and exits at terminal 74. The other half of the torquing current flows counter to the arrows through coils 60 and exits at terminal 70. By superposition, the total current through coils 56 is the forcing current augmented by half of the torquing current while the total current through coils 60 is the forcing current diminished by half the torquing current.

Referring back to FIG. 1, sensor electrodes 76, 78, 80 and 82 are shown fixed to the frame 12 adjacent the side faces of the rotor 22 at the rotor rim 28. Each sensor electrode may be, for example, a layer of metal deposited on a segment of a ring of insulating material fixed to the frame 12. Each of sensor electrodes 76, 78, 80 and 82 is one plate of a sensor capacitor for which the rotor 22 is the other plate.

Figure 5:
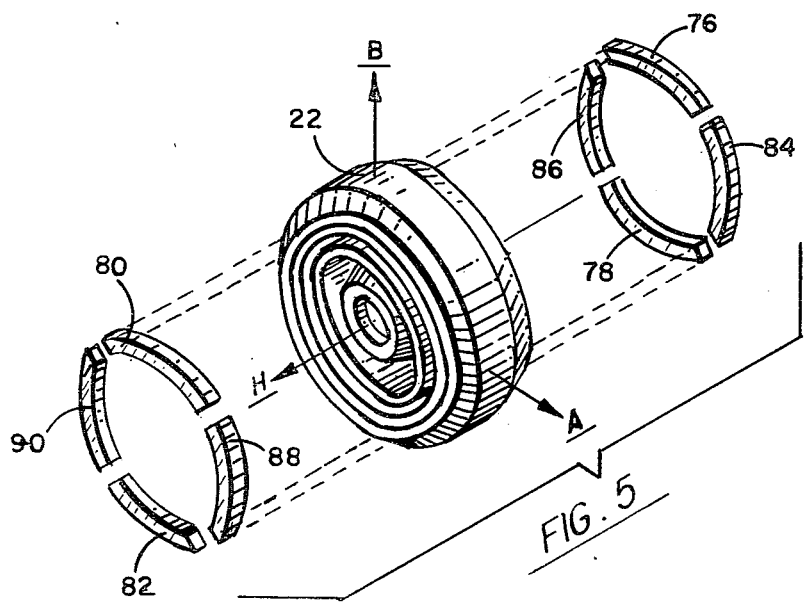
FIG. 5 is an exploded view, in perspective, showing the spatial relationship of the displacement sensors to the rotor in greater detail.

The sensor capacitors and sensor electrodes are shown more clearly in the exploded view of FIG. 5. For sensing both axial deflection and angular displacement, four sensor electrodes 76, 78, 84 and 86 are distributed over distinct quadrants of a ring at one side face of the rotor 22. Another four sensor electrodes 80, 82, 88 and 90 are distributed over corresponding distinct quadrants of another ring at the other side face of the rotor 22. When, for example, the rotor 22 is deflected axially in the positive H direction, the four sensor capacitors formed by the rotor 22 and sensor electrodes 80, 82, 88 and 90 all experience an increase in capacitance. At the same time, the four sensor capacitors formed by the rotor 22 and sensor electrodes 76, 78, 84 and 86 experience a decrease in capacitance. Positive angular displacement of the rotor 22 about the A axis, for example, increases the capacitances at sensor electrodes 78 and 80 while decreasing the capacitances at sensor electrodes 76 and 82. Positive angular displacement of the rotor 22 about the B axis, for example, increases the capacitances at sensor electrodes 84 and 90 while decreasing the capacitances at sensor electrodes 86 and 88.

Figure 6:
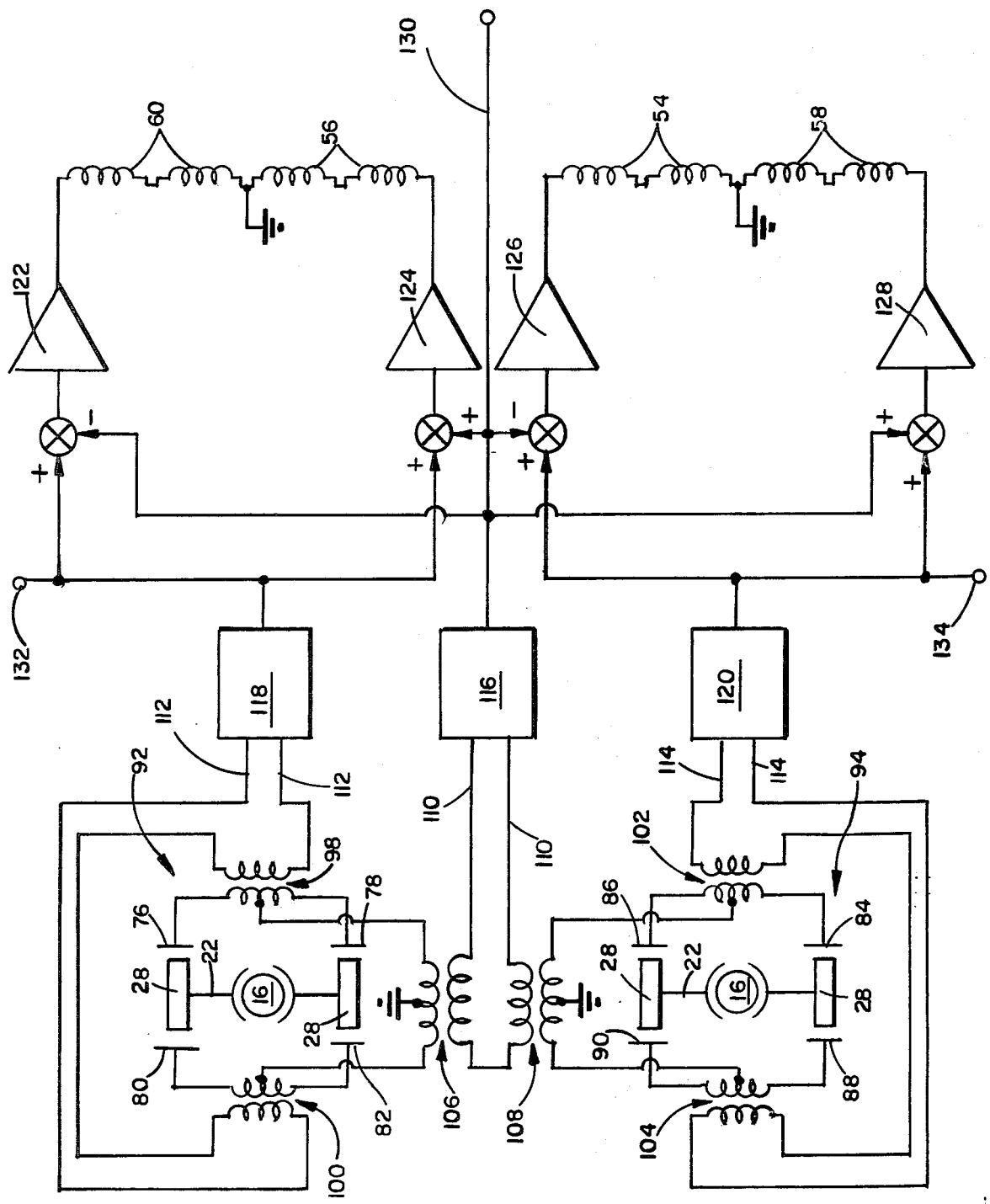
FIG. 6 is a combined functional and schematic diagram showing the interconnections of sensors, closed-loop control circuitry, and forcer-torquer coils for a gyroscope according to the invention operating in a strapdown navigation system.

FIG. 6 is a diagrammatic representation of closed-loop control circuitry for energizing the forcer-torquer in response to signals derived from the capacitive sensors when the gyro rotor 22 experiences axial deflection, angular displacement, or a combination of these in a strapdown navigation system.

In FIG. 6, bridge network 92 interconnects the sensor capacitors formed by the rotor 22 and sensor electrodes 76, 78, 80 and 82. Bridge network 94 interconnects the sensor capacitors formed by the rotor 22 and sensor electrodes 84, 86, 88 and 90. Each of bridges 92 and 94 is energized by an AC signal source (not shown) connected between support ball 16 and the frame 12. As was stated above, support ball 16 and its shaft 18 are insulated from the frame 12. The rotor 22 receives the AC electrical energy from support ball 16 by capacitive electrical coupling.

When the rotor 22 is axially centered over support ball 16 and angularly aligned, all four sensor capacitors of the bridge network 92 have the same capacitance. The AC current flowing from the rim 28 of the rotor 22 to sensor electrode 76 is equal to the AC current flowing to sensor electrode 78. These two equal AC currents flowing in opposite directions in their respective halves of the center-tapped primary winding of transformer 98 cancel each other. Transformer 98 therefore has no output under these conditions. Similar conditions prevail at transformer 100 connected to sensor electrodes 80 and 82 and, in bridge network 94, at transformer 102 connected to sensor electrodes 84 and 86 and at transformer 104 connected to sensor electrodes 88 and 90.

When the rotor 22 is axially deflected from a centered position over support ball 16, the linear displacement of the rim 28 increases the capacitances at sensor electrodes 76, 78, 84 and 86. Correspondingly, the capacitances at sensor electrodes 80, 82, 88 and 90 are decreased. Equally increased AC currents flow through both sides of the center-tapped primary windings of transformers 98 and 102. Equally decreased AC currents flow through both sides of the center-tapped primary windings of transformers 100 and 104. Again, there is no output signal under these conditions from any of the four transformers mentioned.

However, the increased current in the primary winding center-tap of transformer 98 flows through one side of the center-tapped primary winding of transformer 106 to ground. The decreased current in the primary winding center-tap of transformer 100 flows through the other side of the center-tapped primary winding of transformer 106 to ground. The secondary winding of transformer 106 therefore has an output signal. Since the change in capacitances at the sensor electrodes is proportional to the linear displacement or axial deflection of the rotor 22, the output signal of transformer 106 is also proportional to the linear displacement of the rotor 22. A similar output signal appears under these conditions on the secondary winding of transformer 108 due to the increase in capacitances at sensor electrodes 84 and 86 and due to the decrease in capacitances at sensor electrodes 88 and 90. The secondary windings of transformers 106 and 108 are connected in series aiding so that the two output signals augment each other. A linear displacement signal proportional to rotor and bearing axial deflection therefore appears across the conductor pair 110.

When the rotor 22 is angularly displaced in the positive direction about the A axis, the capacitances at sensor electrodes 78 and 80 are increased while the capacitances at sensor electrodes 76 and 82 are decreased. The currents in the two sides of the center-tapped primary windings of transformers 98 and 100 are made unequal thereby. Both transformers 98 and 100 then have output signals on their secondary windings. These secondary windings are connected in series aiding. They provide a signal proportional to the angular displacement about the A axis of the rotor 22 to conductor pair 112.

When the rotor 22 is angularly displaced in the positive direction about the B axis, the capacitances at sensor electrodes 84 and 90 are increased while the capacitances at sensor electrodes 86 and 88 are decreased. The currents in the two sides of the center-tapped primary windings of transformers 102 and 104 are made unequal thereby. Both transformers 102 and 104 then have outputs on their secondary windings. These secondary windings are connected in series aiding. They provide a signal proportional to the angular displacement about the B axis of the rotor 22 to conductor pair 114.

The sensed H axis linear displacement signal appearing across conductor pair 110 is demodulated, compensated for stable closed-loop operation, and amplified by electronic circuitry represented by functional block 116. The modified linear displacement signal is then applied to forcer-torquer coils 60 and 56 through buffer amplifiers 122 and 124. The polarities are selected to provide a forcer current flowing in series through the coils 60 and 56 so as to counteract and inhibit the axial deflection of the rotor 22 which produced the linear displacement signal. Similarly, the modified linear displacement signal output by block 116 is also applied to forcer-torquer coils 58 and 54 through buffer amplifiers 126 and 128. The polarities are selected to provide a forcer current flowing in series through the coils 54 and 58 so as to counteract and inhibit the axial deflection of the rotor 22 which produced the linear displacement signal.

The circuitry in functional block 116 also provides an output signal at terminal 130 which is a measure of the component of the acceleration of the gyroscope 10 in the direction of the spin axis. Where the control is proportional, for example, the acceleration signal at terminal 130 is proportional to both the H axis linear displacement signal and the forcer current. Where the control is proportional plus integral, as another example, the acceleration signal at terminal 130 is proportional to the forcer current. Proportional plus integral control is preferred.

The sensed A axis angular displacement signal appearing across conductor pair 112 is demodulated, compensated for stable closed-loop operation, and amplified by electronic circuitry represented by functional block 118. The modified angular displacement signal is then applied to forcer-torquer coils 60 and 56 through buffer amplifiers 122 and 124. The polarities are selected to provide equal torquer currents flowing in parallel through a first circuit branch comprising coils 60 and another circuit branch comprising coils 56. The polarities are further selected to provide torquer currents which counteract and inhibit that angular displacement of the rotor 22 about the A axis which tends to produce the angular displacement signal. The torque derived from the A axis angular displacement signal is thus applied about the B axis.

The signal provided by the circuitry of functional block 118 is the A axis rate output signal which is made available for use elsewhere at terminal 132.

The sensed B axis angular displacement signal appearing across conductor pair 114 is demodulated, compensated for stable closed-loop operation, and amplified by electronic circuitry represented by functional block 120. The modified angular displacement signal is then applied to forcer-torquer coils 58 and 54 through buffer amplifiers 126 and 128. The polarities are selected to provide equal torquer currents flowing through a first circuit branch comprising coils 54 and another circuit branch comprising coils 58. The polarities are further selected to provide torquer currents which counteract and inhibit that angular displacement of the rotor 22 about the B axis which tends to produce the angular displacement signal. The torque derived from the B axis angular displacement signal is thus applied about the A axis.

The signal provided by the circuitry of functional block 120 is the B axis rate output signal which is made available for use elsewhere at terminal 134.

The forcer currents and the torquer currents are superimposed on each other in the forcer-torquer coils 54, 56, 58, and 60 to counteract and inhibit both linear and angular displacement of the rotor 22.

Figure 7:
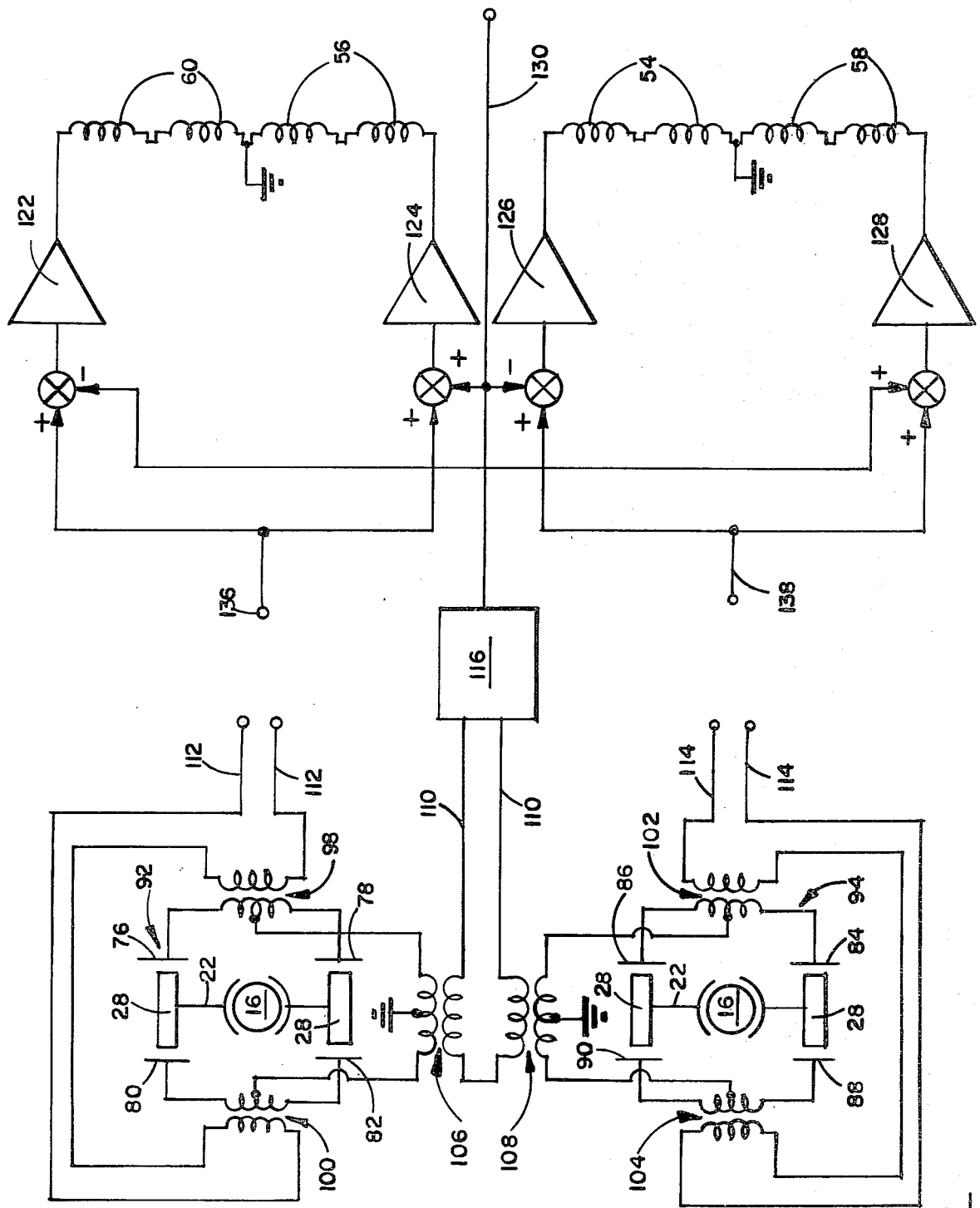
FIG. 7 is a combined functional and schematic diagram showing the interconnections of sensors, closed-loop control circuitry, and forcer-torquer coils for a gyroscope according to the invention operating in a gimballed platform navigation system.

FIG. 7 is a diagrammatic representation of closed-loop control circuitry for energizing the forcer-torquer in response to signals derived from the capacitive sensors when the gyro rotor 22 experiences axial deflection in a gimballed platform navigation system.

In FIG. 7, bridge networks 92 and 94 are identical to those shown in FIG. 6. Their function in a gimballed platform navigation system is the same as in a strapdown navigation system as explained above in connection with the discussion of FIG. 6.

As with the strapdown system, the sensed H axis linear displacement signal appearing across conductor pair 110 is demodulated, compensated for stable closed-loop operation, and amplified by electronic circuitry represented by functional block 116. The modified linear displacement signal is then applied to forcer-torquer coils 54, 56, 58 and 60 in the same manner as was described in the discussion of FIG. 6. As in the case of the strapdown system, the gyro of FIG. 7 provides an output signal at terminal 130 which is a measure of the acceleration of the gyroscope 10 in the direction of the spin axis. As stated above, this output signal is proportional to both the H axis linear displacement signal and the forcer current with proportional control. The output signal is proportional to the forcer current alone when proportional plus integral control is implemented. As has been stated, proportional plus integral control is preferred.

The signal appearing across terminal pair 112 in FIG. 7 is termed the A axis pickoff signal. It is a measure of the angular displacement of the gyro rotor 22 about its A axis. Similarly, the signal appearing across terminal pair 114 is termed the B axis pickoff signal. It is a measure of the angular displacement of the gyro rotor 22 about its B axis. In a gimballed platform navigation system, as is well known, the A and B axis pickoff signals are resolved into signals representing angular displacements of the platform gimbals. These angular displacement signals are the inputs to gimbal servomechanisms which torque the platform gimbals in a manner which tends to cause the gyro housing 14 to follow the rotation of the rotor 22. This tends to keep the A and B axis pickoff signals nulled. The resolvers, gimbal servomechanisms, and the gimballed platform are not shown in FIG. 7.

As is also well known, the orientation of the gyros and the gimballed platform in inertial space is controlled by a navigation system computer in a gimballed platform navigation system. The computer receives acceleration data and converts it to navigation information. In a system employing a gyro 10 in accord with the invention, the signal appearing at output terminal 130 may be employed as a source of this acceleration data for the navigation computer. The navigation computer is not shown in FIG. 7. The navigation computer determines a desired orientation for the gyros and platform and produces rate commands for the platform adopted to produce the desired orientation. The A axis rate command is applied to input terminal 136 in FIG. 7 to produce a torque about the rotor B axis by means of forcer-torquer coils 56 and 60. The B axis command is applied to input terminal 138 in FIG. 7 to produce a torque about the rotor A axis by means of forcer-torquer coils 54 and 58. The applied rate commands cause the rotor 22 and, as a result, the gimballed platform to rotate with the desired rates in inertial space.

There has been described a preferred embodiment of the invention. However, it will be apparent to those skilled in the art that embodiments other than that which has been expressly described are possible and that these other embodiments will fall within the spirit and scope of this invention as set forth in the following claims.

What is claimed is:
1. A gyroscope, comprising:
a frame;
a support ball fixed to said frame;
a rotor disposed over said support ball mounted for rotation about a spin axis of said rotor;

drive means for spinning said rotor about the spin axis; and electromagnetic forcer means for inhibiting axial deflection of said rotor from a centered position over said support ball.

2. A gyroscope as recited in claim 1, further comprising:

sensor means for detecting the deflection of said rotor and for providing a linear displacement signal proportional to the deflection.

3. A gyroscope as recited in claim 2, further comprising:

closed-loop control circuitry for responding to the linear displacement signal and for energizing said electromagnetic forcer means in accordance with the linear displacement signal to restore said rotor to a centered position.

4. A gyroscope as recited in claim 3, wherein said closed-loop control circuitry provides an output signal proportional to the component of the acceleration of said gyroscope in the direction of the spin axis.

5. A gyroscope as recited in claim 3, wherein said electromagnetic forcer means comprises:

means for establishing a time-invariant magnetic field; and coil means for carrying electrical current and for interacting with the magnetic field, wherein said coil means is electrically driven by said close-loop control circuitry, and wherein a selected one of said means for establishing a magnetic field and said coil means is fixed to said frame and the other is fixed to said rotor.

6. A gyroscope as recited in claim 5, wherein said means for establishing a magnetic field comprises:

a pair of pole pieces having a gap between them; and means for establishing the magnetic field across the gap.

7. A gyroscope as recited in claim 6, wherein said coil means comprises:

a sleeve extending into the gap from a point outside thereof; and a coil for carrying electrical current fixed to said sleeve, wherein each full loop of said coil has a portion thereof extending into the gap and a portion thereof lying outside the gap.

8. A gyroscope as recited in claim 5, wherein said means for establishing a magnetic field comprises first and second means for establishing first and second magnetic fields on opposite sides of said rotor, and wherein said coil means comprises first and second coil means disposed on opposite sides of said rotor for interacting with the first and second magnetic fields, respectively.

9. A gyroscope as recited in claim 8, wherein said drive means comprises first and second drive motors symmetrically disposed on opposite sides of said rotor.

10. In a free-rotor gyroscope of the type having a frame, a support ball, and a rotor having a spherical socket disposed about said support ball to form a gas bearing, servoed electromagnetic force rebalance means for inhibiting axial translational deflection of said rotor from a centered position over said support ball, said force rebalance means comprising:

position pick-off means responsive to motion of said rotor from a reference position relative to said support ball for generating a force rebalance signal; and electromagnetic forcer means responsive to said force rebalance signal for opposing said axial translational deflection.

11. The device of claim 10, wherein said servoed force rebalance means further comprises means for energizing said electromagnetic forcer means interposed between an output of said pick-off and an input of said electromagnetic forcer means, and wherein said energizing means provides an output signal indicative of the component of inertial translational acceleration of said gyroscope parallel to the spin axis of said rotor.

12. The device of claim 10, wherein said servoed force rebalance means is operative to inhibit axial translational deflection of said rotor during gyroscope start-up and shut-down as well as during gyro operation intermediate said start-up and shut-down, whereby bearing wear, debris generation and disturbance torques are reduced.

13. The device of claim 10, wherein said electromagnetic forcer means comprises two electromagnetic forcer elements oppositely disposed relative to said rotor along the spin axis thereof, wherein each of said forcer elements is selectively excitable, and wherein the cooperation of said two elements provides both rotor torquing and axial rotor centering.

14. The device recited in claim 10, further comprising dual electromotive spin drive means axially and symmetrically disposed at opposite side faces of said rotor, whereby spin motor bias variations are reduced.

15. A gyroscope, comprising:

a frame;

a support ball fixed to said frame;

a rotor disposed over said support ball mounted for rotation about a spin axis of said rotor;

drive means for spinning said rotor about the spin axis;

electromagnetic forcer means for inhibiting deflection of said rotor from a centered position over said support ball;

sensor means for detecting the deflection of said rotor and providing a linear displacement signal proportional to the deflection; and closed-loop control circuitry for responding to the linear displacement signal and for energizing said electromagnetic forcer means in accordance with the linear displacement signal to restore said rotor to a centered position;

wherein said electromagnetic forcer means comprises:

means for establishing a magnetic field; and coil means for carrying electrical current and for interacting with the magnetic field, wherein said coil means is electrically driven by said closed-loop control circuitry, and wherein a selected one of said means for establishing a magnetic field and said coil means is fixed to said frame and the other is fixed to said rotor;

wherein said means for establishing a magnetic field comprises:

a pair of pole pieces having a gap between them; and means for establishing the magnetic field across the gap; and wherein said coil means comprises:

a sleeve extending into the gap from a point outside thereof; and a coil for carrying electrical current fixed to said sleeve, wherein each full loop of said coil has a portion thereof extending into the gap and a portion thereof lying outside the gap.

16. A gyroscope as recited in claim 15, wherein said pair of pole pieces and said sleeve extend in loops about the spin axis, wherein a plurality of said coils are distributed along a loop on a surface of said sleeve, and wherein each one of said coils occupies a distinct segment of the loop on the surface of said sleeve.

17. A gyroscope as recited in claim 16, wherein said sensor means also detects angular displacements of said rotor and provides angular displacement signals proportional to the angular displacements.

18. A gyroscope as recited in claim 17, wherein a selected pair of said coils is connected to carry forcer currents interacting with the magnetic field to counteract deflection of said rotor, and wherein the selected pair of said coils is connected to carry torquer currents, superimposed on the forcer currents, interacting with the magnetic field to counteract angular displacement of said rotor.

19. In a free-rotor gyroscope of the type having a frame, a support ball, and a rotor having a spherical socket disposed about said support ball to form a gas bearing, servoed force rebalance means for inhibiting translational deflection of said rotor from a centered position over said support ball, said force rebalance means comprising:

position pick-off means responsive to translational motion of said rotor from a reference position relative to said support ball for generating a force rebalance signal; and electromagnetic forcer means responsive to said force rebalance signal for opposing said translational motion, wherein said electromagnetic forcer means comprises two electromagnetic forcer elements oppositely disposed relative to said rotor along the spin axis thereof, wherein each of said forcer elements is selectively excitable, and wherein the cooperation of said two elements provides both rotor torquing and axial rotor centering.

20. A method of operating a free-rotor gyroscope of the type having a frame, a support ball, and a rotor having a spherical socket disposed about said support ball to form a gas bearing, comprising the steps of:

providing electromagnetic axial forcer means in said gyroscope for inhibiting axial deflection of the gyroscope rotor from a centered position over the gyroscope support ball and for inhibiting physical contact between said rotor and said support ball; and energizing the forcer means to maintain the rotor at the axially centered position during start-up, during shut-down, and during normal operation of the gyroscope, whereby scuffing between said rotor and said support ball are reduced.

* * * * *